UNITED STATES PATENT OFFICE.

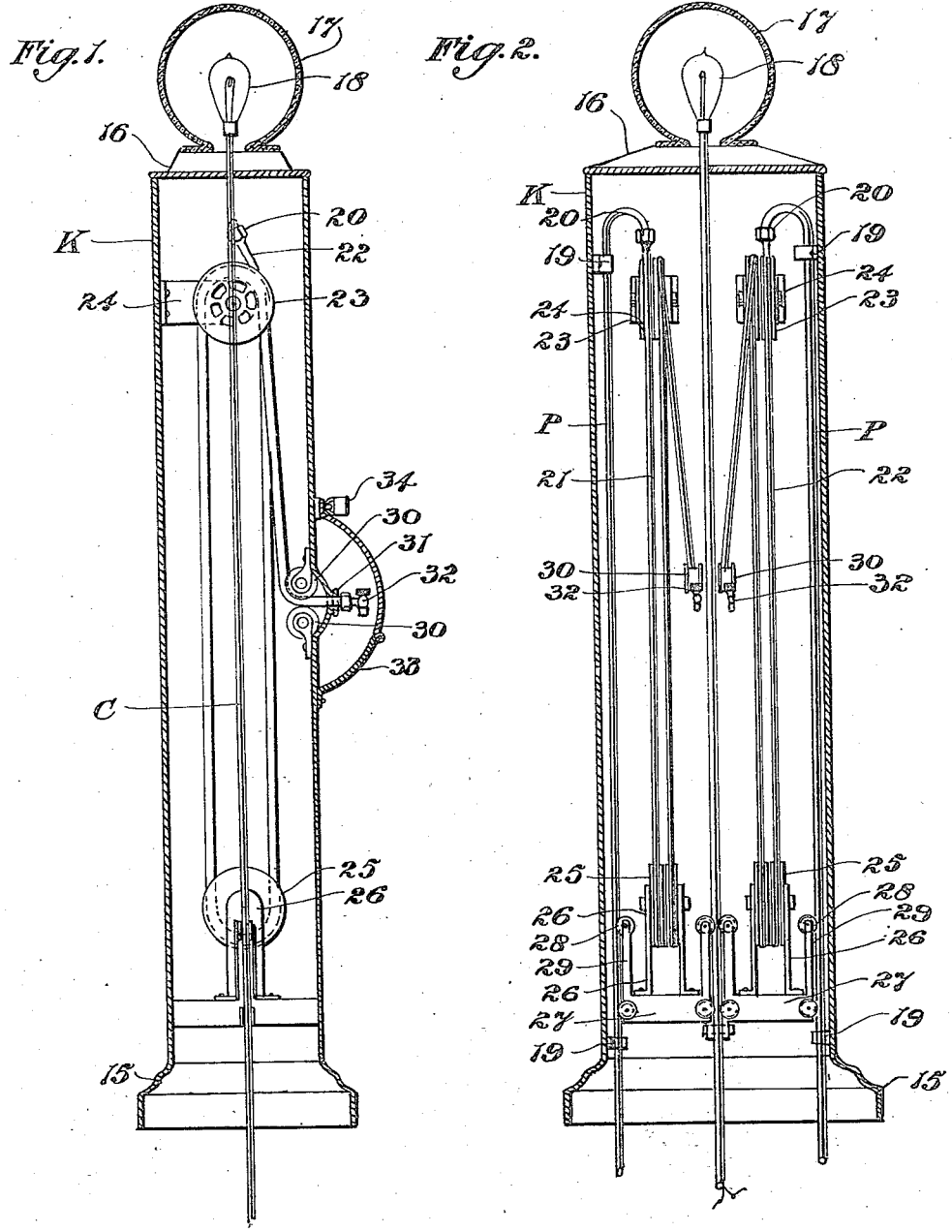

CHARLES E. HILL, OF SAN BERNARDINO, CALIFORNIA.

AIR AND WATER SERVICE HOSE LOCKER.

1,422,359.  Specification of Letters Patent.  Patented July 11, 1922.

Application filed November 26, 1921. Serial No. 517,960.

*To all whom it may concern:*

Be it known that I, CHARLES E. HILL, a citizen of the United States, residing at San Bernardino, in the county of San Bernardino and State of California, have invented new and useful Improvements in Air and Water Service Hose Lockers, of which the following is a specification.

My invention relates to apparatus for facilitating the dispensing of water and air at gasoline stations, and a purpose of my invention is a provision of a hose locker which is constructed to normally house water and air distributing pipes and mechanism for permitting the extensibility of such pipes to various points within a certain radius of the locker to allow of the dispensing of air and water to motor vehicles parked at different points about the locker.

I will describe one form of hose locker embodying my invention, and will then point out the novel features thereof in claims.

In the accompanying drawings,

Figure 1 is a view showing in vertical section one form of hose locker embodying my invention.

Fig. 2 is a slightly enlarged sectional view taken at right angles to Fig. 1.

Referring specifically to the drawings in which similar reference characters refer to similar parts, my invention, in its present embodiment, comprises an elongated casing K of any desired cross sectional contour and formed at its lower end with a relatively wide base 15. The upper end of the casing is closed by a cover 16 upon which is supported a lamp globe 17 containing an incandescent lamp 18.

Extending into the casing K through the lower end thereof and secured in vertical position by means of brackets 19, are pipes P and P', the former constituting a water pipe, and the latter an air pipe which are adapted to be connected at their lower ends to water and air reservoirs (not shown). The upper ends of the pipes P and P' are curved inwardly and downwardly where a union 20 is formed for connecting flexible pipes 21 and 22. These pipes 21 and 22 are trained about pulleys 23 supported in brackets 24 adjacent the upper end of the casing, and pulleys 25 supported in brackets 26 adjacent the lower end of the casing. The brackets 20 are supported on tables 27 which are movable vertically within the casing through the medium of rollers 28 mounted on the tables and on extensions 29. These rollers 28 are grooved to accommodate the pipes P and P' and a conduit C arranged centrally of the casing and in parallelism to said pipes. By this arrangement it will be seen that the rollers 28 have rolling contact with the three pipes so that the tables 27 and consequently the pulleys 25 can be moved vertically within the casing. The tables 27 are preferably weighted so as to normally maintain the pulleys 25 in their lowermost position.

The conduit C is designed for the purpose of accommodating a conductor for supplying current to the lamp 18, and as will be understood, the conductor is connected to a suitable source of current to illuminate the lamp.

As shown in the drawings, the free ends of the flexible pipes 21 and 22 are adapted to be trained through grooved rollers 30 mounted in suitable brackets and disposed adjacent an outlet opening 31. The pipes are extended through the opening 31 and have their ends provided with pet cocks 32 for controlling the dispensing of the fluids therefrom. A cover 33 incloses the ends of the flexible pipes and also the opening 31, and such cover is provided with a hinged section adapted to be secured in closed position by means of a padlock 34.

In practice, the hinged section of the cover 33 is in open position to allow the flexible pipes to be withdrawn from the casing. The flexible pipes are so trained about the pulleys as to allow their being extended the full length and to a suitable distance from the locker so that cars parked at various points about the locker can be reached. When extending the flexible pipes, it will be understood that the pulleys 25 move upwardly within the casing K with the pipes P, P' and C functioning as tracks for the rollers 28. By virtue of the fact that the tables 27 are weighted, it will be clear that when the flexible pipes are released, the pulleys 25 will move to their lowermost position thereby retraining the pipes about the pulleys and thus drawing the same into the casing.

Although I have herein shown and described only one form of hose locker embodying my invention, it is to be understood that various changes and modifications may be made therein without departing from the spirit of the invention and the spirit and scope of the appended claims.

What I claim is:

1. A hose locker comprising a casing, fluid distributing pipes within the casing including rigid sections and flexible sections, pulleys within the casing about which said flexible sections are trained, certain of said pulleys being bodily movable to permit of the untraining and retraining of the flexible sections, weighted tables for supporting the movable pulleys, and rollers carried by the tables and movable over said rigid sections for defining the movement of the tables within the casing.

2. A hose locker comprising a casing, fluid distributing pipes within the casing including rigid sections and flexible sections, pulleys within the casing about which said flexible sections are trained, certain of the pulleys being movable to allow of the untraining and retraining of the flexible sections, a conduit extending centrally of the casing and in parallelism to the rigid pipe sections, tables for supporting the movable pulleys, and rollers mounted on the tables and movable on said rigid pipe sections and said conduit.

In testimony whereof I have signed my name to this specification.

CHARLES E. HILL.